(12) United States Patent
Jiang et al.

(10) Patent No.: US 12,177,140 B2
(45) Date of Patent: Dec. 24, 2024

(54) UPLINK TRANSMISSION METHOD AND TERMINAL

(71) Applicant: VIVO MOBILE COMMUNICATION CO., LTD., Dongguan (CN)

(72) Inventors: Dajie Jiang, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 336 days.

(21) Appl. No.: 17/684,417

(22) Filed: Mar. 2, 2022

(65) Prior Publication Data
US 2022/0190982 A1    Jun. 16, 2022

Related U.S. Application Data

(63) Continuation of application No. PCT/CN2020/105212, filed on Jul. 28, 2020.

(30) Foreign Application Priority Data

Sep. 4, 2019    (CN) .......................... 201910833560.8

(51) Int. Cl.
*H04L 5/00*    (2006.01)
(52) U.S. Cl.
CPC .......... *H04L 5/0042* (2013.01); *H04L 5/0023* (2013.01); *H04L 5/0032* (2013.01); *H04L 5/0051* (2013.01)
(58) Field of Classification Search
CPC ... H04L 5/0042; H04L 5/0023; H04L 5/0032; H04L 5/0051; H04L 5/001; H04L 5/22;
(Continued)

(56) References Cited

U.S. PATENT DOCUMENTS

2009/0093255 A1* 4/2009 Balasubramanian ........................ H04L 5/0098
455/450
2013/0195084 A1* 8/2013 Chen ..................... H04L 5/0048
370/336
(Continued)

FOREIGN PATENT DOCUMENTS

| CN | 102714529 A | 10/2012 |
|---|---|---|
| CN | 104429014 A | 3/2015 |

(Continued)

OTHER PUBLICATIONS

International Search Report issued in corresponding International Application No. PCT/CN2020/105212, mailed Oct. 30, 2020, 6 pages.

(Continued)

*Primary Examiner* — Hardikkumar D Patel
(74) *Attorney, Agent, or Firm* — IPX PLLC

(57) ABSTRACT

Embodiments of the present disclosure provide an uplink transmission method and a terminal configured with at least two uplink carriers. The method may include receiving a scheduling request from a network side device to perform uplink transmission simultaneously on the at least two uplink carriers. The method may also include refusing to perform the scheduling request when at least one of the at least two uplink carriers requires two antennas for transmission.

20 Claims, 2 Drawing Sheets

(58) Field of Classification Search
CPC .... H04L 5/0048; H04L 5/0091; H04W 72/23; H04W 76/15; H04W 76/16; H04W 76/34; H04W 72/044; H04W 72/1268
See application file for complete search history.

(56) References Cited

U.S. PATENT DOCUMENTS

| | | | |
|---|---|---|---|
| 2016/0205681 A1 | 7/2016 | Kim et al. | |
| 2016/0374069 A1* | 12/2016 | Palm | H04W 72/51 |
| 2020/0053718 A1* | 2/2020 | Huang | H04W 72/51 |
| 2020/0322866 A1* | 10/2020 | Ozturk | H04W 8/24 |

FOREIGN PATENT DOCUMENTS

| | | |
|---|---|---|
| CN | 109565312 A | 4/2019 |
| WO | 2018031124 A1 | 2/2018 |
| WO | 2018147928 A1 | 8/2018 |

OTHER PUBLICATIONS

China Telecom et al, "CR to TS 38.101-1: Switching time mask between 1Tx and 2Tx", 3GPP TSG-WG RAN4 Meeting #92, R4-1908622, Aug. 30, 2019.

China Telecom et al., "CR to TS 38.101-3: Switching time mask between 1Tx and 2Tx", 3GPP TSG-WG RAN4 Meeting #92, R4-1908623, Aug. 30, 2019.

China Telecom et al., "Discussion on requirement for switching period between two FR1 uplink carriers", 3GPP TSG-RAN WG4 Meeting #92, R4-1908584, Aug. 30, 2019.

China Telecom, "Ad-hoc minutes on switching period between two FR1 uplink carriers", 3GPP TSG-RAN WG4 Meeting #92, R4-1910531, Aug. 30, 2019.

First Office Action issued in related Chinese Application No. 201910833560.8, mailed Jan. 13, 2022, 8 pages.

Samsung, "DC for UE with Single UL Carrier Capability", 3GPP TSG-WG1 NR ad-Hoc#2, R1-1710741, Jun. 17, 2017.

* cited by examiner

UPLINK TRANSMISSION METHOD AND TERMINAL

CROSS-REFERENCE TO RELATED APPLICATIONS

This application is a continuation of International Application No. PCT/CN2020/105212, filed Jul. 28, 2020, which claims priority to Chinese Patent Application No. 201910833560.8, filed Sep. 4, 2019. The entire contents of each of the above-referenced applications are expressly incorporated herein by reference.

TECHNICAL FIELD

Embodiments of the present disclosure relate to the field of communications technologies, and more specifically, to an uplink transmission method and a terminal.

BACKGROUND

If a new radio (NR) terminal (for example, user equipment (UE)) needs to support 3 transmit antennas (referred to as 3 transmissions (3Tx) for short) simultaneously, 3 transmit channels and related components such as power amplifiers (PA), filters, and antennas need to be supported. The requirement of supporting 3Tx simultaneously undoubtedly increases costs of the terminal and affects the layout of components in the terminal. Therefore, in general, an NR terminal only supports 2Tx or 1Tx.

If it is configured in a network that a terminal needs to support 3Tx simultaneously, but the terminal only supports 2Tx, how the terminal performs uplink transmission is an urgent problem to be solved.

SUMMARY

Embodiments of the present disclosure provide an uplink transmission method and a terminal, to solve the problem of how the terminal performs uplink transmission if the terminal is configured by a network that a terminal needs to support 3Tx simultaneously, but the terminal only supports 2Tx.

According to a first aspect, an embodiment of the present disclosure provides a method of uplink transmission, performed by a terminal configured with at least two uplink carriers. The method may include receiving a scheduling request from a network side device to perform uplink transmission simultaneously on the at least two uplink carriers; and refusing to perform the scheduling request when at least one of the at least two uplink carriers requires two antennas for transmission.

According to a second aspect, an embodiment of the present disclosure further provides a terminal, including: a processing module, configured to: receive a scheduling request from a network side device to perform uplink transmission simultaneously on the at least two uplink carriers; and refuse to perform the scheduling request when at least one of the at least two uplink carriers requires two antennas for transmission.

According to a third aspect, an embodiment of the present disclosure further provides a terminal, including: a processor, a memory, and a program stored in the memory and executable on the processor. When the program is executed by the processor, steps of the uplink transmission method according to the first aspect are implemented.

According to a fourth aspect, an embodiment of the present disclosure further provides a computer-readable storage medium. The computer-readable storage medium stores a computer program. When the computer program is executed by a processor, steps of the uplink transmission method according to the first aspect are implemented.

In the embodiments of the present disclosure, the terminal is not scheduled to perform uplink transmission on at least two carriers simultaneously, or the terminal drops transmission of some uplink carriers. This solves the problem of how the UE performs uplink transmission in an UL CA/EN-DC/NE-DC/SUL scenario when the UE only supports 2Tx, but it is configured by the network that the UE needs to support 3Tx simultaneously, and improves the processing procedure of uplink transmission of the UE.

BRIEF DESCRIPTION OF DRAWINGS

With reference to detailed descriptions in exemplary implementations in the following descriptions, various other advantages and benefits become clear to a person of ordinary skills in the art. The accompanying drawings are merely used to show the exemplary implementations, and are not considered as limitations to the present disclosure. In all the accompanying drawings, the same reference symbol is used to indicate the same part unless indicated otherwise. In the accompanying drawings.

DETAILED DESCRIPTION OF THE EMBODIMENTS

For ease of understanding the embodiments of the present disclosure, several technical points are first described:

Technical point 1:

NR UE needs to support 3Tx simultaneously in the following four scenarios:

Scenario 1: NR uplink (UL) carrier aggregation (CA), for example: CA with 2 component carriers (CC), where one CC supports 2Tx and the other CC supports 1Tx.

Scenario 2: Dual connectivity of a radio access network of the fourth-generation (4G) mobile communication technology and NR of the fifth-generation (5G) mobile communication technology (this type of dual connectivity is referred to as EN-DC). For example, long term evolution (LTE) supports 1Tx and NR supports 2Tx.

Scenario 3: Dual connectivity of 5GNR and a 4G radio access network (this type of dual connectivity is referred to as NE-DC). For example, NR supports 2Tx and LTE supports 1Tx.

Scenario 4: Supplementary uplink (SUL), for example, it is configured in the network that the UE performs transmission on a normal UL and an SUL simultaneously, where the SUL supports 1Tx and the normal uplink supports 2Tx.

In the above four scenarios, it is configured that the UE requires 2Tx transmission on at least one uplink carrier, or it is configured that the UE performs 1Tx transmission on each of at least two uplink carriers.

Figure 1:
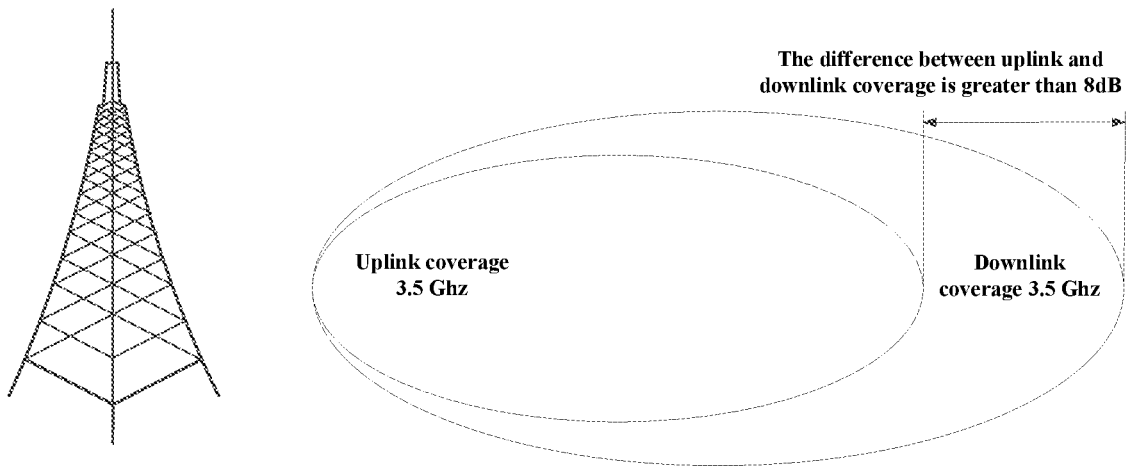
FIG. 1 is a schematic diagram of exemplary uplink and downlink coverage of NR.

Technical point 2: On the principle and the mechanism of SUL:

Referring to FIG. 1, the difference between uplink and downlink budgets of NR is relatively large, for example, the difference is greater than 8 db (3.5 GHz time division duplexing (TDD) is used as an example), and a lower uplink frequency needs to be added to enhance NR uplink coverage.

- A cell of NR consists of two uplink carriers (for example, f1 and f2) and one downlink carrier (for example, f1).
- A base station (next-generation eNodeB, gNB) broadcasts combined SUL band numbers, which indicate specific uplink carriers (f1 and f2) and a specific downlink carrier (f1).
- The UE selects f1 (an SUL) or f2 (a normal UL) according to downlink signal strength to complete random access channel (RACH) transmission and initial access.

A physical uplink shared channel (PUSCH), a physical uplink control channel (PUCCH), and a sounding reference signal (SRS) are transmitted through the carrier f1 or f2, or transmitted through an SUL and a normal UL simultaneously.

Technical point 3: Uplink 2Tx-related parameters, and a precoding information and number of layers field and an antenna port field in a Downlink control information (DCI) format 0_1.

The precoding information and number of layers field indicates the number of layers for uplink transmission. Refer to Table 1 to Table 4. Specifically, refer to the bit fields mapped to index "0" and "4" in Table 1, the bit field mapped to index "0" in Table 2, and the bit field mapped to index "2" in Table 3.

The antenna port field indicates a demodulation reference signal (DMRS) port for uplink transmission. Refer to Table 5 to Table 8.

TABLE 1

Precoding information and number of layers for 4 antenna ports if transform precoder is disabled and maxRank = 2 or 3 or 4 (Precoding information and number of layers, for 4 antenna ports, if transform precoder is disabled and maxRank = 2 or 3 or 4).

| Bit field mapped to index | CodebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: Transmit precoding matrix indication (TPMI) = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| ... | ... | | | | |
| 47 | 1 layers: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |

TABLE 1-continued

Precoding information and number of layers for 4 antenna ports if transform precoder is disabled and maxRank = 2 or 3 or 4 (Precoding information and number of layers, for 4 antenna ports, if transform precoder is disabled and maxRank = 2 or 3 or 4).

| Bit field mapped to index | CodebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 2

Precoding information and number of layers for 4 antenna ports if transform precoder is enabled, or if transform precoder is disabled and maxRank = 1 (Precoding information and number of layers for 4 antenna ports, if transform precoder is enabled, or if transform precoder is disabled and maxRank = 1).

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| ... | ... | ... | ... | | |
| 11 | 1 layer: TPMI = 11 | 11 | 1 layer: TPMI = 11 | | |
| 12 | 1 layers: TPMI = 12 | 12-15 | reserved | | |
| ... | ... | | | | |
| 27 | 1 layers: TPMI = 27 | | | | |
| 28-31 | reserved | | | | |

TABLE 3

Precoding information and number of layers for 2 antenna ports if transform precoder is disabled and maxRank = 2 (Precoding information and number of layers, for 2 antenna ports, if transform precoder is disabled and maxRank = 2).

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

TABLE 4

Precoding information and number of layers for 2 antenna ports if transform precoder is enabled, or if transform precoder is disabled and maxRank = 1 (Precoding information and number of layers, for 2 antenna ports, if transform precoder is enabled, or if transform precoder is disabled and maxRank = 1).

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

TABLE 5

Antenna port, transform precoder is enabled, dmrs-Type = 1, maxLength = 1 (Antenna port (s), transform precoder is enabled, dmrs-Type = 1, maxLength = 1).

| Value | Number of DMRS CDM group (s) without data | DMRS port |
|---|---|---|
| 0 | 2 | 0 |
| 1 | 2 | 1 |

TABLE 5-continued

Antenna port, transform precoder is enabled, dmrs-Type = 1, maxLength = 1 (Antenna port (s), transform precoder is enabled, dmrs-Type = 1, maxLength = 1).

| Value | Number of DMRS CDM group (s) without data | DMRS port |
| --- | --- | --- |
| 2 | 2 | 2 |
| 3 | 2 | 3 |

TABLE 6

Antenna port, transform precoder is enabled, dmrs-Type = 1, maxLength = 2 (Antenna port (s), transform precoder is enabled, dmrs-Type = 1, maxLength = 2).

| Value | Number of DMRS CDM group (s) without data | DMRS port (s) | Number of front-load symbols |
| --- | --- | --- | --- |
| 0 | 2 | 0 | 1 |
| 1 | 2 | 1 | 1 |
| 2 | 2 | 2 | 1 |
| 3 | 2 | 3 | 1 |
| 4 | 2 | 0 | 2 |
| 5 | 2 | 1 | 2 |
| 6 | 2 | 2 | 2 |
| 7 | 2 | 3 | 2 |
| 8 | 2 | 4 | 2 |
| 9 | 2 | 5 | 2 |
| 10 | 2 | 6 | 2 |
| 11 | 2 | 7 | 2 |
| 12-15 | Reserved | Reserved | Reserved |

TABLE 7

Antenna port, transform precoder is disabled, dmrs-Type = 1, maxLength = 1, rank = 1 (Antenna port (s), transform precoder is disabled, dmrs-Type = 1 maxLength = 1, rank = 1).

| Value | Number of DMRS CDM group (s) without data | DMRS port (s) |
| --- | --- | --- |
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |

TABLE 8

Antenna port, transform precoder is disabled, dmrs-Type = 1, maxLength = 1, rank = 2 (Antenna port (s), transform precoder is disabled, dmrs-Type = 1, maxLength = 1, rank = 2).

| Value | Number of DMRS CDM group (s) without data | DMRS port (s) |
| --- | --- | --- |
| 0 | 1 | 0, 1 |
| 1 | 2 | 0, 1 |
| 2 | 2 | 2, 3 |
| 3 | 2 | 0, 2 |
| 4-7 | Reserved | Reserved |

The following clearly and completely describes the technical solutions in the embodiments of this disclosure with reference to the accompanying drawings in the embodiments of this disclosure. Apparently, the described embodiments are some rather than all of the embodiments of this disclosure. All other embodiments acquired by a person of ordinary skill in the art based on the embodiments of the present disclosure without creative efforts shall fall within the protection scope of the present disclosure.

The term "include" and any other variants in the description and the claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and the claims means at least one of the connected objects. For example, A and/or B represents the following three cases: Only A exists, only B exists, and both A and B exist.

In the embodiments of the present disclosure, words/phrases such as "exemplary" and "for example" are used to represent giving an example, an illustration, and/or a description. Any embodiment or design scheme described as "exemplary" or "for example" in the embodiments of the present disclosure should not be construed as being more preferred or advantageous than other embodiments or design schemes. To be precise, the use of terms such as "exemplary" and "for example" is intended to present a related concept in a specific manner.

The technology described in this specification is not limited to a Long Term Evolution (LTE)/LTE-Advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems.

The terms "system" and "network" are usually used interchangeably. A CDMA system may implement radio technologies such as CDMA 2000, Universal Terrestrial Radio Access (UTRA), or the like. UTRA includes Wideband CDMA (WCDMA) and other CDMA variants. A TDMA system may implement radio technologies such as a Global System for Mobile Communication (GSM), or the like. The OFDMA system can implement radio technologies such as Ultra Mobile Broadband (UMB), Evolved-UTRA (E-UTRA), IEEE 802.11 (Wi-Fi), IEEE 802.16 (WiMAX), IEEE 802.20, and Flash-OFDM. UTRA and E-UTRA are parts of the Universal Mobile Telecommunications System (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA 2000 and UMB are described in a document from an origination named "3rd Generation Partnership Project 2" (3GPP2). The technology described herein can be used in the above-mentioned systems and radio technologies as well as other systems and radio technologies.

Figure 2:
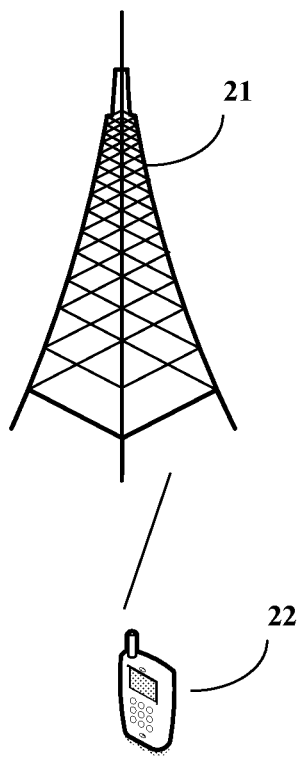
FIG. 2 is a schematic architectural diagram of an exemplary wireless communications system, according to an embodiment of the present disclosure.

The embodiments of the present disclosure are described below with reference to the accompanying drawings. An uplink transmission method and a terminal provided in the embodiments of this disclosure may be applied to a wireless communications system. FIG. 2 is a schematic architectural diagram of an exemplary wireless communications system, according to an embodiment of the present disclosure. As shown in FIG. 2, the wireless communications system may include: a network device 21 and a terminal 22. The terminal 22 may be denoted as UE 12, and the terminal 22 may communicate with the network device 21 (to transmit signaling or transmit data). In actual application, a connection between the foregoing devices may be a wireless connection. To conveniently and intuitively represent a connection relationship between the devices, a solid line is used for illustration in FIG. 2.

A network device 21 provided by embodiments of the present disclosure may be a base station. The base station may be a commonly used base station, or an evolved node base station (eNB), or a network device (for example, a next-generation node base station (gNB) in a 5G system or a transmission and reception point (TRP)), or the like.

The terminal 22 provided by the embodiment of the present disclosure may be a mobile phone, a tablet personal computer, a notebook computer, an ultra-mobile personal computer (UMPC), a netbook or personal digital assistant (PDA), a mobile Internet device (MID), a wearable device or a vehicle-mounted device.

Figure 3:
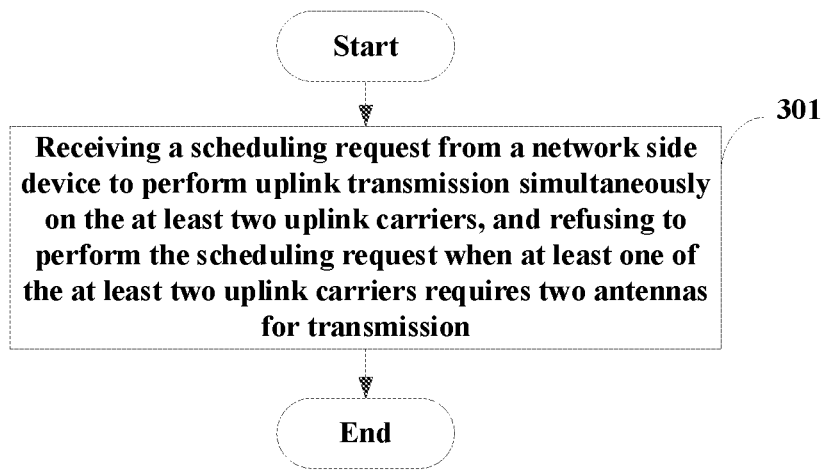
FIG. 3 is a flowchart of an exemplary uplink transmission method, according to an embodiment of the present disclosure.

Referring to FIG. 3, an embodiment of the present disclosure further provides an uplink transmission method. The method is performed by a terminal (e.g., 22) configured with at least two uplink carriers and specifically includes step 301.

Step 301: The method may include receiving a scheduling request from a network side device (e.g., 21) to perform uplink transmission simultaneously on the at least two uplink carriers. The method may also include refusing to perform the scheduling request when at least one of the at least two uplink carriers requires two antennas for transmission.

In some embodiments, the method may further include dropping transmission of at least one of the at least two uplink carriers.

In this embodiment of the present disclosure, the network side device may schedule the terminal to perform uplink transmission on one uplink carrier based on the fact that the terminal does not expect to be scheduled to perform uplink transmission on at least two uplink carriers simultaneously. Alternatively, the network side may still schedule the terminal to perform uplink transmission on at least two uplink carriers simultaneously by sending a scheduling request to the terminal. In this case, the terminal may refuse to perform the scheduling request by dropping the transmission of at least one uplink carrier in the at least two uplink carriers.

When the terminal refuses to perform uplink transmission on at least two uplink carriers simultaneously, the terminal may not respond to the scheduling request of the network side device, or the terminal can respond to the scheduling request of the network side device, but the response behavior of the terminal is inconsistent with the expected behavior of the scheduling request of the network side device, that is, corresponding processing is not performed according to the scheduling requesting. In an exemplary implementation, the terminal can explicitly or implicitly inform the network side device that the terminal does not expect to be scheduled to perform uplink transmission on at least two uplink carriers simultaneously, or the communication protocol may specify that the terminal does not expect to be scheduled to perform uplink transmission on at least two uplink carriers simultaneously.

In the embodiments of the present disclosure, the terminal is configured with at least two uplink carriers in any one of the following scenarios: (1) uplink carrier aggregation (ULCA); (2) EN-DC; (3) NE-DC; and (4) SUL. For example: it is configured in the network that the UE performs transmission on a normal UL (normal UpLink) and an SUL simultaneously, where the SUL supports 1Tx and the normal uplink supports 2Tx.

In some embodiments, dropping transmission of at least one uplink carrier in the at least two uplink carriers includes any one of the following:

(1) dropping transmission of an uplink carrier of a secondary cell of the terminal;

(2) dropping transmission of an uplink carrier of a primary cell of the terminal;

(3) dropping transmission of an uplink carrier configured by radio resource control signaling, where the uplink carrier can be a carrier configured by radio resource control signaling or other types of signaling, for example: an uplink carrier of a secondary cell, an uplink carrier of a primary cell, a normal uplink carrier, or a supplementary uplink carrier;

(4) dropping transmission of a common uplink carrier;

(5) dropping transmission of a supplementary uplink carrier; and (6) dropping transmission of at least one uplink carrier in the at least two uplink carriers according to a time sequence.

For example, transmission of a first uplink carrier of the at least two uplink carriers can be dropped, where a starting symbol of an uplink channel or an uplink signal of the first uplink carrier is earlier than a starting symbol of an uplink channel or an uplink signal of at least one other uplink carrier of the at least two uplink carriers; or transmission of a second uplink carrier of the at least two uplink carriers can be dropped, where a starting symbol of an uplink channel or an uplink signal of the second uplink carrier is later than a starting symbol of an uplink channel or an uplink signal of at least one other uplink carrier of the at least two uplink carriers. The symbol may be an orthogonal frequency division multiplexing (OFDM) symbol.

In some embodiments, the method shown in FIG. 3 may further include: obtaining a time division multiplexing pattern of at least one uplink carrier in the at least two uplink carriers; and performing transmission on at least one uplink carrier in the at least two uplink carriers according to the time division multiplexing pattern. Further, uplink transmission slots or symbols indicated by the time division multiplexing pattern are not overlapped in the time domain.

In some embodiments, the method shown in FIG. 3 may further include: refusing to perform uplink transmission on a first time domain resource of at least one uplink carrier in the at least two uplink carriers, where the first time domain resource is a time domain resource other than uplink time domain resources indicated by the time division multiplexing pattern.

In some embodiments, a condition that at least one uplink carrier requires two transmit antennas for transmission includes one or more of the following:

(1) A maximum number of uplink multiple-input multiple-output layers configured for the at least one uplink carrier is greater than 1, or a number of uplink multiple-input multiple-output layers configured for the at least one uplink carrier is greater than 1.

(2) A number of sounding reference signal ports configured for the at least one uplink carrier is greater than 1.

(3) A number of demodulation reference signal ports configured for the at least one uplink carrier is greater than 1.

(4) The at least one uplink carrier is configured with uplink multiple-input multiple-output (MIMO).

In some embodiments, the scheduling request to perform uplink transmission on the at least two uplink carriers simultaneously includes performing one or more of the following:

(1) Uplink channels or uplink signals of the terminal on the at least two uplink carriers are overlapped in time domain.

(2) A time interval between uplink channels or uplink signals of the terminal on the at least two uplink carriers is less than a preset value. Further, the preset value is associated with the handover time defined by radio access network (RAN) working group 4 (RAN4).

In the embodiments of the present disclosure, the terminal is configured to refuse to perform uplink transmission on at least two carriers simultaneously, including dropping transmission of some uplink carriers. This solves the problem of how the UE performs uplink transmission in an UL CA/EN-DC/NE-DC/SUL scenario when the UE only supports 2Tx, but it is configured in the network that the UE needs to support 3Tx simultaneously, thereby improving the processing procedure of uplink transmission of the UE.

In an UL CA/EN-DC/NE-DC/SUL (it is configured that transmission is performed on a normal UL and an SUL simultaneously) scenario, when the terminal is configured with at least two uplink carriers and at least one uplink carrier in the at least two uplink carriers requires 2Tx transmission, the terminal may be configured to refuse to perform uplink transmission on the at least two uplink carriers simultaneously.

An uplink carrier requires 2Tx transmission when one or more of the following occurs:

(1) A maximum number of uplink multiple-input multiple-output layers (maximum UL MIMO layer) configured for the terminal on the at least one uplink carrier is greater than 1, or a number of uplink multiple-input multiple-output layers (UL MIMO layer) configured for the terminal on the at least one uplink carrier is greater than 1.

(2) A number of sounding reference signal ports (SRS port) configured for the terminal on the at least one uplink carrier is greater than 1.

(3) A number of demodulation reference signal (DMRS) ports (port) configured for the terminal on the at least one uplink carrier is greater than 1.

(4) The at least one uplink carrier is configured with uplink MIMO.

Performing uplink transmission simultaneously includes one or more of the following: (1) Uplink signals/channels of the terminal on different uplink carriers (different UL carriers) are overlapped in the time domain.

(2) A time interval between uplink signals/channels of the terminal on different uplink carriers is less than X microseconds (us), where X is associated with the handover time defined by RAN4.

In some implementations, when the uplink transmission on at least two uplink carriers simultaneously is scheduled, the terminal may drop transmission of some uplink carriers. This may include:

(1) In a non-SUL (Non-SUL) scenario (such as UL CA/EN-DC/NE-DC), if uplink transmission on at least two uplink carriers simultaneously is scheduled, the terminal may drop transmission of some cells, including one or more of the following:

(a) the terminal may drop the transmission of an uplink carrier of a secondary cell (Scell);

(b) the terminal may drop the transmission of an uplink carrier of a primary cell (Pcell);

(c) the terminal may determine to drop the transmission of an uplink carrier of a component carrier based on the radio resource control (RRC) configuration; and (d) dropping transmission of at least one uplink carrier in the at least two uplink carriers according to a time sequence.

For example, transmission of an uplink carrier A of the at least two uplink carriers may be dropped, where a starting symbol of an uplink channel or an uplink signal of the uplink carrier A is earlier than a starting symbol of an uplink channel or an uplink signal of an uplink carrier B of the at least two uplink carriers; or transmission of an uplink carrier A of the at least two uplink carriers may be dropped, where a starting symbol of an uplink channel or an uplink signal of the uplink carrier A is later than a starting symbol of an uplink channel or an uplink signal of an uplink carrier B of the at least two uplink carriers.

(2) In an SUL (it is configured that transmission is performed on a normal UL and an SUL simultaneously) scenario, when uplink transmission on at least two uplink carriers simultaneously is scheduled, the terminal may drop transmission of an uplink carrier, including one or more of the following:

(a) the terminal may drop transmission of a common uplink carrier;

(b) the terminal may drop transmission of a supplementary uplink carrier;

(c) the terminal may drop transmission of a common uplink carrier or transmission of a supplementary uplink carrier based on an RRC configuration; and (d) dropping transmission of at least one uplink carrier in the at least two uplink carriers according to a time sequence.

For example, transmission of an uplink carrier A of the at least two uplink carriers may be dropped, where a starting symbol of an uplink channel or an uplink signal of the uplink carrier A is earlier than a starting symbol of an uplink channel or an uplink signal of an uplink carrier B of the at least two uplink carriers; or transmission of an uplink carrier A of the at least two uplink carriers may be dropped, where a starting symbol of an uplink channel or an uplink signal of the uplink carrier A is later than a starting symbol of an uplink channel or an uplink signal of an uplink carrier B of the at least two uplink carriers.

In some implementations, the terminal may be configured with a time division multiplexing pattern (UL CC TDM pattern) of the uplink carrier, and uplink transmission slots (slot)/symbols (symbol) indicated by the time division multiplexing pattern are not overlapped in time domain (time domain overlap).

For example, the base station configures a TDM pattern with a period of 10 slots for component carrier 1: 1111100000, indicating that the base station can perform uplink transmission for component carrier 1 in the first 5 slots of every 10 slots.

Besides, the base station configures a TDM pattern with a period of 10 slots for component carrier 2: 0000011111, indicating that component carrier 2 can perform uplink transmission in the last 5 slots of every 10 slots.

For each uplink carrier, the terminal is not expected to be scheduled to transmit an uplink signal/channel on a resource other than uplink time domain resources indicated by the TDM pattern.

In the embodiments of the present disclosure, the terminal is not scheduled or is configured to refuse to perform uplink transmission on at least two carriers simultaneously, including dropping transmission of some uplink carriers. This solves the problem of how the UE performs uplink transmission in an UL CA/EN-DC/NE-DC/SUL scenario when the UE only supports 2Tx, but it is configured in the network that the UE needs to support 3Tx simultaneously, and improves the processing procedure of uplink transmission of the UE.

This embodiment of the present disclosure further provides a terminal. A principle of solving a problem by the terminal is similar to that of the uplink transmission method in the embodiment of the present disclosure. Therefore, for the implementation of the terminal, reference may be made to the implementation of the method, and details are not repeated again.

Figure 4:
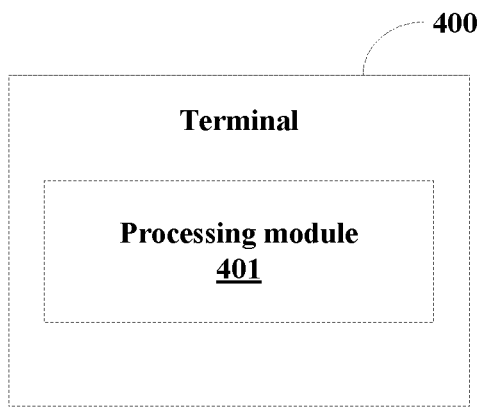
FIG. 4 is a schematic diagram of an exemplary terminal, according to an embodiment of the present disclosure.

Referring to FIG. 4, an exemplary embodiment of the present disclosure further provides a terminal. The terminal 400 includes: a processing module 401, configured to: in a case that the terminal is configured with at least two uplink carriers (for example, in an UL CA/EN-DC/NE-DC/SUL (it is configured that transmission is performed on a normal UL and an SUL simultaneously) scenario) and at least one uplink carrier in the at least two uplink carriers requires two transmit antennas for transmission, not expect to be scheduled to perform uplink transmission on the at least two uplink carriers simultaneously.

In some implementations, the processing module 401 is further configured to: if the terminal is scheduled to perform uplink transmission on the at least two uplink carriers simultaneously, drop transmission of at least one uplink carrier in the at least two uplink carriers.

In some embodiments, the dropping transmission of at least one uplink carrier in the at least two uplink carriers includes any one of the following:
(1) dropping transmission of an uplink carrier of a secondary cell of the terminal;
(2) dropping transmission of an uplink carrier of a primary cell of the terminal;
(3) dropping transmission of an uplink carrier configured by radio resource control signaling, where the uplink carrier can be a carrier configured by radio resource control signaling, for example: an uplink carrier of a secondary cell, an uplink carrier of a primary cell, a normal uplink carrier, or a supplementary uplink carrier;
(4) dropping transmission of a common uplink carrier;
(5) dropping transmission of a supplementary uplink carrier; and
(6) dropping transmission of at least one uplink carrier in the at least two uplink carriers according to a time sequence.

For example, transmission of a first uplink carrier of the at least two uplink carriers is dropped, where a starting symbol of an uplink channel or an uplink signal of the first uplink carrier is earlier than a starting symbol of an uplink channel or an uplink signal of at least one other uplink carrier of the at least two uplink carriers; or transmission of a second uplink carrier of the at least two uplink carriers is dropped, where a starting symbol of an uplink channel or an uplink signal of the second uplink carrier is later than a starting symbol of an uplink channel or an uplink signal of at least one other uplink carrier of the at least two uplink carriers.

In some implementations, the terminal 400 further includes:
an obtaining module, configured to obtain a time division multiplexing pattern of at least one uplink carrier in the at least two uplink carriers; and
a transmission module, configured to perform transmission on at least one uplink carrier in the at least two uplink carriers according to the time division multiplexing pattern.

In some implementations, uplink transmission slots or symbols indicated by the time division multiplexing pattern are not overlapped in the time domain.

In some implementations, the processing module 401 is further configured to: not expect to be scheduled to perform uplink transmission on a first time domain resource of at least one uplink carrier in the at least two uplink carriers, where the first time domain resource is a time domain resource other than uplink time domain resources indicated by the time division multiplexing pattern.

In some implementations, that at least one uplink carrier requires two transmit antennas for transmission includes one or more of the following:
(1) A maximum number of uplink multiple-input multiple-output layers configured for the at least one uplink carrier is greater than 1, or a number of uplink multiple-input multiple-output layers configured for the at least one uplink carrier is greater than 1.
(2) A number of sounding reference signal ports configured for the at least one uplink carrier is greater than 1.
(3) A number of demodulation reference signal ports configured for the at least one uplink carrier is greater than 1.
(4) The at least one uplink carrier is configured with uplink multiple-input multiple-output.

In some implementations, the performing uplink transmission on the at least two uplink carriers simultaneously includes one or more of the following:
(1) Uplink channels or uplink signals of the terminal on the at least two uplink carriers are overlapped in time domain.
(2) A time interval between uplink channels or uplink signals of the terminal on the at least two uplink carriers is less than a preset value. Further, the preset value is associated with the handover time defined by RAN4.

The terminal provided in this embodiment of the present disclosure may perform the foregoing embodiment shown in FIG. 3. An implementation principle and a technical effect of the terminal are similar, and details are not described again in this embodiment.

Figure 5:
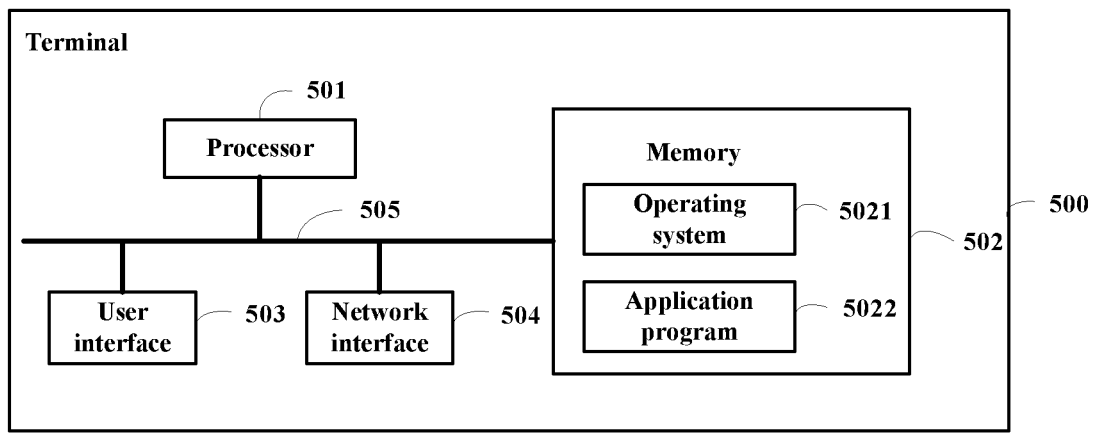
FIG. 5 is a schematic diagram of another exemplary terminal, according to an embodiment of the present disclosure.

As shown in FIG. 5, a terminal 500 shown in FIG. 5 includes: at least one processor 501, a memory 502, at least one network interface 504, and a user interface 503. Various components of the terminal 500 are coupled by using a bus system 505. It may be understood that the bus system 505 is used to implement connection communication between these components. In addition to a data bus, the bus system 505 also includes a power bus, a control bus, and a status signal bus. However, for clarity of description, various buses are marked as the bus system 505 in FIG. 5.

The user interface 503 may include a display, a keyboard, or a clicking device (for example, a mouse, a trackball, a touch panel, or a touchscreen.

It may be understood that the memory 502 in this embodiment of the present disclosure may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 502 of the system and the method described in the embodiments of the present disclosure is intended to include, but is not limited to, these and any other suitable types of memories.

In some implementations, the memory 502 stores the following element: an executable module or a data structure, a subset of an executable module or a data structure, or an extended set of an executable module or a data structure: an operating system 5021 and an application program 5022.

The operating system 5021 includes various system programs, for example, a framework layer, a kernel library layer, and a driver layer. The operating system 5021 is configured to implement various basic services and process hardware-based tasks. The application program 5022 includes various application programs, for example, a media player and a browser, and is configured to implement various application services. A program implementing the method in the embodiments of the present disclosure may be included in the application program 5022.

In an embodiment of the present disclosure, when a program or an instruction stored in the memory 502 is called, specifically, when a program or an instruction stored in the application program 5022 is executed, the following steps of the method in FIG. 3 are implemented.

The terminal provided in this embodiment of the present disclosure may perform the foregoing method embodiment shown in FIG. 3. An implementation principle and a technical effect of the terminal are similar, and details are not described again in this embodiment.

The method or algorithm steps described in combination with content disclosed in the present disclosure may be implemented by hardware, or may be implemented by a processor by executing software instructions. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. An exemplary storage medium is coupled to a processor, so that the processor can read information from the storage medium and can write information to the storage medium. Certainly, the storage medium may also be an integral part of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing description of embodiments. It should be understood that the foregoing descriptions are merely descriptions of embodiments of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may take the form of a hardware-only embodiment, a software-only embodiment, or an embodiment with both software and hardware. Moreover, the embodiments of the present disclosure may use a form of a computer program product that is implemented on one or more computer-usable storage media (including but are not limited to a magnetic disk memory, a CD-ROM, an optical memory, or the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions can also be stored in a computer-readable memory that can instruct a computer or another programmable data processing device to work in a specific manner, so that an instruction stored in the computer-readable memory generates a product including an instruction apparatus, and the instruction apparatus implements a function specified in one or more processes of the flowchart and/or one or more blocks of the block diagram.

These computer program instructions may also be loaded onto a computer or another programmable data processing device, so that a series of operation steps are performed on the computer or another programmable device to produce computer-implemented processing, thereby providing instructions executed on the computer or the another programmable device to implement the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

The invention claimed is:

1. A method of uplink transmission, performed by a terminal configured with at least two uplink carriers, the method comprising:
   receiving a scheduling request from a network side device to perform uplink transmission simultaneously on the at least two uplink carriers; and refusing to perform the scheduling request when at least one of the at least two uplink carriers requires two antennas for transmission.

2. The method according to claim 1, wherein refusing to perform the scheduling request comprises:
dropping transmission of at least one of the at least two uplink carriers.

3. The method according to claim 2, wherein dropping transmission of at least one of the at least two uplink carriers comprises at least one of:
dropping transmission of an uplink carrier of a secondary cell of the terminal;
dropping transmission of an uplink carrier of a primary cell of the terminal;
dropping transmission of a common uplink carrier;
dropping transmission of a supplementary uplink carrier;
dropping transmission of an uplink carrier configured by radio resource control signaling; or
dropping transmission of at least one of the at least two uplink carriers according to a time sequence.

4. The method according to claim 2, wherein dropping transmission of at least one of the at least two uplink carriers comprises:
dropping transmission of a first uplink carrier of the at least two uplink carriers, wherein a starting symbol of an uplink channel or an uplink signal of the first uplink carrier is earlier than a starting symbol of an uplink channel or an uplink signal of at least one other uplink carrier of the at least two uplink carriers; or
dropping transmission of a second uplink carrier of the at least two uplink carriers, wherein a starting symbol of an uplink channel or an uplink signal of the second uplink carrier is later than a starting symbol of an uplink channel or an uplink signal of at least one other uplink carrier of the at least two uplink carriers.

5. The method according to claim 1, further comprising:
obtaining a time division multiplexing pattern of at least one of the at least two uplink carriers; and
performing transmission on the at least one of the at least two uplink carriers according to the time division multiplexing pattern.

6. The method according to claim 5, wherein uplink transmission slots or symbols indicated by the time division multiplexing pattern are not overlapped in a time domain.

7. The method according to claim 5, further comprising:
refusing to perform uplink transmission on a first time domain resource of at least one of the at least two uplink carriers, wherein the first time domain resource is a time domain resource other than uplink time domain resources indicated by the time division multiplexing pattern.

8. The method according to claim 1, wherein a condition that at least one of the at least two uplink carriers requires two antennas for transmission comprises at least one of:
a number or a maximum number of uplink multiple-input multiple-output layers configured for the at least one of the at least two uplink carriers is greater than 1;
a number of sounding reference signal ports configured for the at least one of the at least two uplink carriers is greater than 1;
a number of demodulation reference signal ports configured for the at least one of the at least two uplink carriers is greater than 1; or
the at least one of the at least two uplink carriers is configured with uplink multiple-input multiple-output.

9. The method according to claim 1, wherein the scheduling request to perform the uplink transmission on the at least two uplink carriers simultaneously comprises performing at least one of:
uplink channels or uplink signals of the terminal on the at least two uplink carriers are overlapped in a time domain; or
a time interval between uplink channels or uplink signals of the terminal on the at least two uplink carriers is less than a preset value.

10. The method according to claim 1, wherein the terminal is configured with at least two uplink carriers in at least one of the following scenarios:
uplink carrier aggregation;
dual connectivity of a radio access network of the fourth-generation mobile communication technology and new radio of the fifth-generation mobile communication technology;
dual connectivity of new radio of the fifth-generation mobile communication technology and a radio access network of the fourth-generation mobile communication technology; or
supplementary uplink.

11. A terminal, comprising:
a memory storing computer readable instructions; and
a processor coupled to the memory and configured to execute the computer readable instructions to perform a method of uplink transmission, the method comprising:
receiving a scheduling request from a network side device to perform uplink transmission simultaneously on at least two uplink carriers; and
refusing to perform the scheduling request when at least one of the at least two uplink carriers requires two antennas for transmission.

12. The terminal according to claim 11, wherein refusing to perform the scheduling request comprises:
dropping transmission of at least one of the at least two uplink carriers.

13. The terminal according to claim 12, wherein dropping transmission of at least one of the at least two uplink carriers comprises at least one of:
dropping transmission of an uplink carrier of a secondary cell of the terminal;
dropping transmission of an uplink carrier of a primary cell of the terminal;
dropping transmission of a common uplink carrier;
dropping transmission of a supplementary uplink carrier;
dropping transmission of an uplink carrier configured by radio resource control signaling; or
dropping transmission of at least one of the at least two uplink carriers according to a time sequence.

14. The terminal according to claim 12, wherein dropping transmission of at least one of the at least two uplink carriers comprises:
dropping transmission of a first uplink carrier of the at least two uplink carriers, wherein a starting symbol of an uplink channel or an uplink signal of the first uplink carrier is earlier than a starting symbol of an uplink channel or an uplink signal of at least one other uplink carrier of the at least two uplink carriers; or
dropping transmission of a second uplink carrier of the at least two uplink carriers, wherein a starting symbol of an uplink channel or an uplink signal of the second uplink carrier is later than a starting symbol of an uplink channel or an uplink signal of at least one other uplink carrier of the at least two uplink carriers.

15. The terminal according to claim 11, the method further comprises:
obtaining a time division multiplexing pattern of at least one of the at least two uplink carriers; and
performing transmission on the at least one of the at least two uplink carriers according to the time division multiplexing pattern.

16. The terminal according to claim 15, wherein uplink transmission slots or symbols indicated by the time division multiplexing pattern are not overlapped in a time domain.

17. The terminal according to claim 15, wherein the method further comprises:
refusing to perform uplink transmission on a first time domain resource of at least one of the at least two uplink carriers, wherein the first time domain resource is a time domain resource other than uplink time domain resources indicated by the time division multiplexing pattern.

18. The terminal according to claim 11, wherein a condition that at least one of the at least two uplink carriers requires two antennas for transmission comprises at least one of:
a number or a maximum number of uplink multiple-input multiple-output layers configured for the at least one of the at least two uplink carriers is greater than 1;
a number of sounding reference signal ports configured for the at least one of the at least two uplink carriers is greater than 1;
a number of demodulation reference signal ports configured for the at least one of the at least two uplink carriers is greater than 1; or
the at least one of the at least two uplink carriers is configured with uplink multiple-input multiple-output.

19. The terminal according to claim 11, wherein the scheduling request to perform the uplink transmission on the at least two uplink carriers simultaneously comprises performing at least one of:
uplink channels or uplink signals of the terminal on the at least two uplink carriers are overlapped in a time domain; or
a time interval between uplink channels or uplink signals of the terminal on the at least two uplink carriers is less than a preset value.

20. A non-transitory computer-readable storage medium storing computer readable instructions, when executed by a processor, implement a method of uplink transmission, the method comprising:
receiving a scheduling request from a network side device to perform uplink transmission simultaneously on at least two uplink carriers; and
refusing to perform the scheduling request when at least one of the at least two uplink carriers requires two antennas for transmission.

* * * * *